(12) United States Patent
Qi et al.

(10) Patent No.: US 12,365,807 B2
(45) Date of Patent: *Jul. 22, 2025

(54) POLYMERIC DISPERSANT

(71) Applicant: Xerox Corporation, Norwalk, CT (US)

(72) Inventors: Genggeng Qi, Webster, NY (US); Yu Qi, Penfield, NY (US); Lanhui Zhang, Webster, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 820 days.

This patent is subject to a terminal disclaimer.

(21) Appl. No.: 17/533,193

(22) Filed: Nov. 23, 2021

(65) Prior Publication Data

US 2023/0159777 A1 May 25, 2023

(51) Int. Cl.
| | | |
|---|---|---|
| *C09D 11/00* | (2014.01) | |
| *C08F 220/18* | (2006.01) | |
| *C08F 220/28* | (2006.01) | |
| *C08F 226/06* | (2006.01) | |
| *C09D 11/033* | (2014.01) | |
| *C09D 11/107* | (2014.01) | |
| *C09D 11/326* | (2014.01) | |

(52) U.S. Cl.
CPC ...... *C09D 11/326* (2013.01); *C08F 220/1818* (2020.02); *C08F 220/286* (2020.02); *C08F 226/06* (2013.01); *C09D 11/033* (2013.01); *C09D 11/107* (2013.01)

(58) Field of Classification Search
CPC ... C09D 11/326; C09D 11/033; C09D 11/107; C08F 220/1818; C08F 220/286; C08F 220/06
USPC .............................. 106/31.01, 31.13, 31.86
See application file for complete search history.

(56) References Cited

U.S. PATENT DOCUMENTS

| | | |
|---|---|---|
| 5,389,958 A | 2/1995 | Bui et al. |
| 5,455,315 A | 10/1995 | Paine et al. |
| 8,686,089 B2 | 4/2014 | Li et al. |
| 8,710,117 B2 | 4/2014 | Tanaka et al. |
| 8,871,859 B2 | 10/2014 | Li et al. |
| 9,200,170 B2 | 12/2015 | Lee et al. |

FOREIGN PATENT DOCUMENTS

| | | | | |
|---|---|---|---|---|
| JP | 2012031407 A | * | 2/2012 | ............. C09C 1/644 |
| WO | WO-2019093140 A1 | * | 5/2019 | ........... C09D 11/037 |

OTHER PUBLICATIONS

Genggeng Qi, et al., U.S. Appl. No. 17/533,206, filed Nov. 23, 2021, "Self-Crosslinked Polymeric Dispersant," not yet published.

* cited by examiner

*Primary Examiner* — James E McDonough

(74) *Attorney, Agent, or Firm* — Marylou J. Lavoie, Esq

(57) ABSTRACT

A polymeric dispersant including a copolymer comprising: a basic moiety; an alkyl group having from about 4 to about 40 carbon atoms; an aromatic group; and a steric hydrophilic group. An aqueous ink jet ink composition including the polymeric dispersant.

8 Claims, No Drawings

POLYMERIC DISPERSANT

RELATED APPLICATIONS

Commonly assigned U.S. patent application Ser. No. 17/533,206, entitled "Self-Crosslinked Polymeric Dispersant", filed concurrently herewith, is hereby incorporated by reference herein in its entirety.

BACKGROUND

Disclosed herein is a polymeric dispersant comprising: a copolymer comprising: a basic moiety; an alkyl group having from about 4 to about 40 carbon atoms; an aromatic group; and a steric hydrophilic group.

Also disclosed herein is a composition comprising: a particulate; a vehicle; and optional surfactant; and a polymeric dispersant comprising a copolymer of the structure:

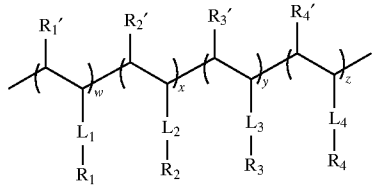

wherein w is an integer of from 1 to about 400; wherein x is an integer of from 0 to about 480; wherein y is an integer of from 1 to about 160; wherein z is an integer of from 1 to about 400; wherein $L_1$ through $L_4$ are optional linking groups; wherein $L_1$ is a linking group selected from a member of the group consisting of ether, urea, epoxy, ester, amide, oxygen, sulfur, and an alkyl chain of from 1 to about 6 carbon atoms; wherein $L_2$ is a linking group selected from a member of the group consisting of ether, urea, epoxy, ester, amide, oxygen, sulfur, and an alkyl chain of from 1 to about 6 carbon atoms; wherein $L_3$ is a linking group selected from a member of the group consisting of ether, urea, epoxy, ester, amide, oxygen, sulfur, and an alkyl chain of from 1 to about 6 carbon atoms; wherein $L_4$ is a linking group selected from a member of the group consisting of ether, urea, epoxy, ester, amide, oxygen, sulfur, and an alkyl chain of from 1 to about 6 carbon atoms; wherein $R_1$ is $-(CH_2)_{3-39}CH_3$; wherein $R_2$ is an aromatic group having from 6 to about 30 carbon atoms, in embodiments selected from a member of the group consisting of benzyl, naphthalenyl, anthracenyl, tetracenyl, pentacenyl, tristyrylbenzyl, and pyridiyl; wherein $R_3$ is $-(CH_2CH_2O)_m(CH_2CHCH_3O)_nR$, wherein m is about 10 to about 450, n is about 0 to about 80, and R is H or $CH_3$; wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms. In embodiments, the equations $$0.05 < \frac{w(M_{R_1} + M_{R_1'}) + x(M_{R_2} + M_{R_2'})}{w(M_{R_1} + M_{R_1'}) + x(M_{R_2} + M_{R_2'}) + y(M_{R_3} + M_{R_3'}) + z(M_{R_4} + M_{R_4'})} < 0.4$$

$$0.01 < \frac{zM_{R_4}}{w(M_{R_1} + M_{R_1'}) + x(M_{R_2} + M_{R_2'}) + y(M_{R_3} + M_{R_3'}) + z(M_{R_4} + M_{R_4'})}$$

are used to define the dispersant components, wherein w, x, y, and z are integers as defined hereinabove, and wherein $M_{R1}$ is the molecular weight of the $R_1$ group; $M_{R1}'$ is the molecular weight of the $R_1'$ group;

$M_{R2}$ is the molecular weight of the $R_2$ group; $M_{R2}'$ is the molecular weight of the $R_2'$ group;

$M_{R3}$ is the molecular weight of the $R_3$ group; $M_{R3}'$ is the molecular weight of the $R_3'$ group;

$M_{R4}$ is the molecular weight of the $R_4$ group; and $M_{R4}'$ is the molecular weight of the $R_4'$ group.

Also disclosed herein is an aqueous ink jet ink comprising: water; a co-solvent; an optional wax dispersion; an optional latex resin; a surfactant; a pigment; and a polymeric dispersant comprising a copolymer of the structure:

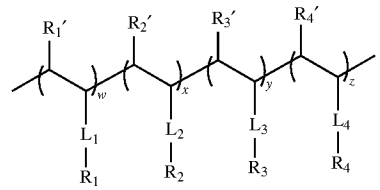

wherein w is an integer of from 1 to about 400; wherein x is an integer of from 0 to about 480; wherein y is an integer of from 1 to about 160; wherein z is an integer of from 1 to about 400; wherein $L_1$ through $L_4$ are optional linking groups; wherein $L_1$ is a linking group selected from a member of the group consisting of ether, urea, epoxy, ester, amide, oxygen, sulfur, and an alkyl chain of from 1 to about 6 carbon atoms; wherein $L_2$ is a linking group selected from a member of the group consisting of ether, urea, epoxy, ester, amide, oxygen, sulfur, and an alkyl chain of from 1 to about 6 carbon atoms; wherein $L_3$ is a linking group selected from a member of the group consisting of ether, urea, epoxy, ester, amide, oxygen, sulfur, and an alkyl chain of from 1 to about 6 carbon atoms; wherein $L_4$ is a linking group selected from a member of the group consisting of ether, urea, epoxy, ester, amide, oxygen, sulfur, and an alkyl chain of from 1 to about 6 carbon atoms; wherein $R_1$ is $-(CH_2)_{3-39}CH_3$; wherein $R_2$ is an aromatic group selected from a member of the group consisting of benzyl, naphthalenyl, anthracenyl, tetracenyl, pentacenyl, tristyrylbenzyl, and pyridiyl; wherein $R_3$ is $-(CH_2CH_2O)_m(CH_2CHCH_3O)_nR$, wherein m is about 10 to about 450, n is about 0 to about 80, and R is H or $CH_3$; wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms. In embodiments, the equations $$0.05 < \frac{w(M_{R_1} + M_{R'_1}) + x(M_{R_2} + M_{R'_2})}{w(M_{R_1} + M_{R'_1}) + x(M_{R_2} + M_{R'_2}) + y(M_{R_3} + M_{R'_3}) + z(M_{R_4} + M_{R'_4})} < 0.4$$

$$0.01 < \frac{zM_{R_4}}{w(M_{R_1} + M_{R'_1}) + x(M_{R_2} + M_{R'_2}) + y(M_{R_3} + M_{R'_3}) + z(M_{R_4} + M_{R'_4})}$$

are used to define the dispersant components, wherein w, x, y, and z are integers as defined hereinabove, wherein $M_{R1}$ is the molecular weight of the $R_1$ group; $M_{R1}'$ is the molecular weight of the $R_1'$ group; $M_{R2}$ is the molecular weight of the $R_2$ group; $M_{R2}'$ is the molecular weight of the $R_2'$ group; $M_{R3}$ is the molecular weight of the $R_3$ group; $M_{R3}'$ is the molecular weight of the $R_3'$ group; $M_{R4}$ is the molecular weight of the $R_4$ group; and $M_{R4}'$ is the molecular weight of the $R_4'$ group.

Reliable pigment dispersion is an important factor for aqueous ink jet ink applications. Carbon black pigments are especially difficult to disperse in aqueous media because of their high specific surface areas and low surface charge. Poorly dispersed pigments may cause aqueous inks or coatings to have storage instability, jet clogging, low optical density, and to exhibit loss of covering power. Various black pigment dispersions made with commercially available dispersants have been attempted to be incorporated into aqueous ink jet inks. However, the resultant inks often exhibited problems such as being unstable in accelerated aging tests or having limited tolerance to ink formulation variation, especially to co-solvent type inks and contents.

Currently available dispersants may be suitable for their intended purposes. However a need remains for improved dispersants, particularly for improved dispersants for aqueous ink jet inks.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a polymeric dispersant comprising: a copolymer comprising: a basic moiety; an alkyl group having from about 4 to about 40 carbon atoms; an aromatic group; and a steric hydrophilic group.

Further described is a composition comprising: a particulate; a vehicle; and optional surfactant; and a polymeric dispersant comprising a copolymer of the structure:

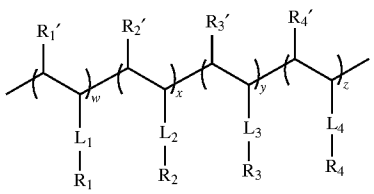

wherein w is an integer of from 1 to about 400; wherein x is an integer of from 0 to about 480; wherein y is an integer of from 1 to about 160; wherein z is an integer of from 1 to about 400; wherein $L_1$ through $L_4$ are optional linking groups; wherein $L_1$ is a linking group selected from a member of the group consisting of ether, urea, epoxy, ester, amide, oxygen, sulfur, and an alkyl chain of from 1 to about 6 carbon atoms; wherein $L_2$ is a linking group selected from a member of the group consisting of ether, urea, epoxy, ester, amide, oxygen, sulfur, and an alkyl chain of from 1 to about 6 carbon atoms; wherein $L_3$ is a linking group selected from a member of the group consisting of ether, urea, epoxy, ester, amide, oxygen, sulfur, and an alkyl chain of from 1 to about 6 carbon atoms; wherein $L_4$ is a linking group selected from a member of the group consisting of ether, urea, epoxy, ester, amide, oxygen, sulfur, and an alkyl chain of from 1 to about 6 carbon atoms; wherein $R_1$ is —$(CH_2)_{3-39}CH_3$; wherein $R_2$ is an aromatic group selected from a member of the group consisting of benzyl, naphthalenyl, anthracenyl, tetracenyl, pentacenyl, tristyrylbenzyl, and pyridiyl; wherein $R_3$ is —$(CH_2CH_2O)_m(CH_2CHCH_3O)_nR$, wherein m is about 10 to about 450, n is about 0 to about 80, and R is H or $CH_3$; wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms.

Further described is an aqueous ink jet ink comprising: water; a co-solvent; an optional wax dispersion; an optional latex resin; a surfactant; a pigment; and a polymeric dispersant comprising a copolymer of the structure:

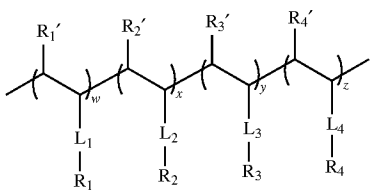

wherein w is an integer of from 1 to about 400; wherein x is an integer of from 0 to about 480; wherein y is an integer of from 1 to about 160; wherein z is an integer of from 1 to about 400; wherein $L_1$ through $L_4$ are optional linking groups; wherein $L_1$ is a linking group selected from a member of the group consisting of ether, urea, epoxy, ester, amide, oxygen, sulfur, and an alkyl chain of from 1 to about 6 carbon atoms; wherein $L_2$ is a linking group selected from a member of the group consisting of ether, urea, epoxy, ester, amide, oxygen, sulfur, and an alkyl chain of from 1 to about 6 carbon atoms; wherein $L_3$ is a linking group selected from a member of the group consisting of ether, urea, epoxy, ester, amide, oxygen, sulfur, and an alkyl chain of from 1 to about 6 carbon atoms; wherein $L_4$ is a linking group selected from a member of the group consisting of ether, urea, epoxy, ester, amide, oxygen, sulfur, and an alkyl chain of from 1 to about 6 carbon atoms; wherein $R_1$ is —$(CH_2)_{3-39}CH_3$; wherein $R_2$ is an aromatic group selected from a member of the group consisting of benzyl, naphthalenyl, anthracenyl, tetracenyl, pentacenyl, tristyrylbenzyl, and pyridiyl; wherein $R_3$ is —$(CH_2CH_2O)_m(CH_2CHCH_3O)_nR$, wherein m is about 10 to about 450, n is about 0 to about 80, and R is H or $CH_3$; wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms.

DETAILED DESCRIPTION

A polymeric dispersant suitable to disperse various pigments, in embodiments, carbon black, for waterborne and aqueous ink applications is described. The dispersant polymer comprises a basic moiety, an alkyl group, and a steric hydrophilic group. The base and the alkyl groups function as pigment-affinic anchors. The base moiety can include an aromatic amine, an aliphatic amine, pyridine, and combinations thereof, although not limited. The base moiety can be incorporated into the backbone of the polymeric dispersant or be a pendant group linked to the backbone of the dispersant. The steric group may comprise polyethylene glycol having a weight average molecular weight of from about 500 to about 20,000, or from about 500 to about 5,000, which provides compatibility with the dispersing medium. The polymeric dispersant can be synthesized by a manufacturable solution polymerization process. Since the dispersant is compatible with a wide variety of film-forming polymer resins and latexes by design, a pigment dispersion prepared using the dispersant enables an aqueous ink or coating to have superior storage stability, reliable jetting quality, and enhanced color strength. More specifically, black ink prepared with a carbon black dispersion prepared with the present dispersant exhibited excellent aging stability in various ink formulations containing different co-solvents, high co-solvent loadings, and a variety of surfactants. The higher optical density of the print image was also demonstrated compared with a print image made with an ink comprising a pigment dispersion made with a commercially available dispersant. The present dispersant is in the category of environmentally friendly non-APE (alkyl phenol ethoxylates) dispersants.

In embodiments, a polymeric dispersant is described comprising: a copolymer comprising: a basic moiety; an alkyl group having from about 4 to about 40 carbon atoms; an aromatic group; and a steric hydrophilic group.

The polymeric dispersant contains a basic moiety. In embodiments, the basic moiety is selected from a member of the group consisting of an aromatic amine, an aliphatic amine, pyridine, imidazole, benzimidazole, histidine, guanidine, phosphazene base, an ammonium base, a phosphonium base, an onium base, and combinations thereof. In embodiments, the basis moiety is selected from a member of the group consisting of an aromatic amine, an aliphatic amine, pyridine, and combinations thereof.

In embodiments the copolymer polymeric dispersant comprises a backbone and the basic moiety is incorporated in the backbone or the basic moiety is a pendant group linked to the backbone.

The polymeric dispersant contains an alkyl group. In embodiments, the alkyl group is an alkyl group having from about 4 to about 40 carbon atoms.

The polymeric dispersant contains a steric hydrophilic group. In embodiments, the steric hydrophilic group comprises a member selected from the group consisting of polyethylene glycol, polypropylene glycol, and combinations thereof. In embodiments, the steric hydrophilic group comprises polyethylene glycol. In a specific embodiment, the steric hydrophilic group comprises polyethylene glycol having a weight average molecular weight of from about 500 to about 20,000, or from about 500 to about 5,000.

Molecular weight of the polymeric dispersant is determined by gel permeation chromatography (GPC) according to the usual methods. Weight average molecular weight may be determined by GPC using polystyrene standards.

In embodiments, the polymeric dispersant is a copolymer is of the structure:

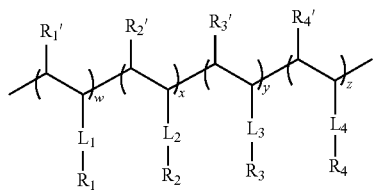

wherein w is an integer of from 1 to about 400; wherein x is an integer of from 0 to about 480; wherein y is an integer of from 1 to about 160; wherein z is an integer of from 1 to about 400; wherein $L_1$ through $L_4$ are optional linking groups; wherein, if present, $L_1$ through $L_4$ are as follows, wherein $L_1$ is a linking group selected from a member of the group consisting of ether, urea, epoxy, ester, amide, oxygen, sulfur, and an alkyl chain of from 1 to about 6 carbon atoms; wherein $L_2$ is a linking group selected from a member of the group consisting of ether, urea, epoxy, ester, amide, oxygen, sulfur, and an alkyl chain of from 1 to about 6 carbon atoms; wherein $L_3$ is a linking group selected from a member of the group consisting of ether, urea, epoxy, ester, amide, oxygen, sulfur, and an alkyl chain of from 1 to about 6 carbon atoms; wherein $L_4$ is a linking group selected from a member of the group consisting of ether, urea, epoxy, ester, amide, oxygen, sulfur, and an alkyl chain of from 1 to about 6 carbon atoms; wherein $R_1$ is —$(CH_2)_{3-39}CH_3$; wherein $R_2$ is an aromatic group selected from a member of the group consisting of benzyl, naphthalenyl, anthracenyl, tetracenyl, pentacenyl, tristyrylbenzyl, and pyridiyl; wherein $R_3$ is —$(CH_2CH_2O)_m(CH_2CHCH_3O)_nR$, wherein m is about 10 to about 450, n is about 0 to about 80, and R is H or $CH_3$; wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms. In embodiments, the equations $$0.05 < \frac{w(M_{R_1} + M_{R_1'}) + x(M_{R_2} + M_{R_2'})}{w(M_{R_1} + M_{R_1'}) + x(M_{R_2} + M_{R_2'}) + y(M_{R_3} + M_{R_3'}) + z(M_{R_4} + M_{R_4'})} < 0.4$$

$$0.01 < \frac{zM_{R_4}}{w(M_{R_1} + M_{R_1'}) + x(M_{R_2} + M_{R_2'}) + y(M_{R_3} + M_{R_3'}) + z(M_{R_4} + M_{R_4'})}$$

are used to define the dispersant components, wherein w, x, y, and z are integers, and wherein $M_{R1}$ is the molecular weight of the $R_1$ group; $M_{R1}'$ is the molecular weight of the $R_1'$ group; $M_{R2}$ is the molecular weight of the $R_2$ group; $M_{R2}'$ is the molecular weight of the $R_2'$ group; $M_{R3}$ is the molecular weight of the $R_3$ group; $M_{R3}'$ is the molecular weight of the $R_3'$ group; $M_{R4}$ is the molecular weight of the $R_4$ group; and $M_{R4}'$ is the molecular weight of the $R_4'$ group. In embodiments, w is an integer of from 1 to about 400; wherein x is an integer of from 0 to about 480; wherein y is an integer of from 1 to about 160; and wherein z is an integer of from 1 to about 400.

In embodiments, the polymeric dispersant is free of, that is does not contain, alkyl phenol ethoxylate.

The polymeric dispersant herein can be used for any suitable or desired composition. In embodiments, provided herein is a composition comprising: a particulate; a vehicle; an optional surfactant; and a polymeric dispersant comprising a copolymer of the structure:

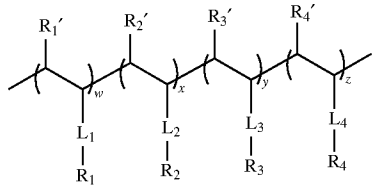

wherein w is an integer of from 1 to about 400; wherein x is an integer of from 0 to about 480; wherein y is an integer of from 1 to about 160; wherein z is an integer of from 1 to about 400; wherein $L_1$ through $L_4$ are optional linking groups; wherein $L_1$ is a linking group selected from a member of the group consisting of ether, urea, epoxy, ester, amide, oxygen, sulfur, and an alkyl chain of from 1 to about 6 carbon atoms; wherein $L_2$ is a linking group selected from a member of the group consisting of ether, urea, epoxy, ester, amide, oxygen, sulfur, and an alkyl chain of from 1 to about 6 carbon atoms; wherein $L_3$ is a linking group selected from a member of the group consisting of ether, urea, epoxy, ester, amide, oxygen, sulfur, and an alkyl chain of from 1 to about 6 carbon atoms; wherein $L_4$ is a linking group selected from a member of the group consisting of ether, urea, epoxy, ester, amide, oxygen, sulfur, and an alkyl chain of from 1 to about 6 carbon atoms; wherein $R_1$ is $-(CH_2)_{3-39}CH_3$; wherein $R_2$ is an aromatic group selected from a member of the group consisting of benzyl, naphthalenyl, anthracenyl, tetracenyl, pentacenyl, tristyrylbenzyl, and pyridiyl; wherein $R_3$ is $-(CH_2CH_2O)_m(CH_2CHCH_3O)_nR$, wherein m is about 10 to about 450, n is about 0 to about 80, and R is H or $CH_3$; wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms. In embodiments, the equations $$0.05 < \frac{w(M_{R_1} + M_{R_1'}) + x(M_{R_2} + M_{R_2'})}{w(M_{R_1} + M_{R_1'}) + x(M_{R_2} + M_{R_2'}) + y(M_{R_3} + M_{R_3'}) + z(M_{R_4} + M_{R_4'})} < 0.4$$

$$0.01 < \frac{zM_{R_4}}{w(M_{R_1} + M_{R_1'}) + x(M_{R_2} + M_{R_2'}) + y(M_{R_3} + M_{R_3'}) + z(M_{R_4} + M_{R_4'})}$$

are used to define the dispersant components, wherein w, x, y, and z are integers as defined herein, and wherein $M_{R1}$ is the molecular weight of the $R_1$ group; $M_{R1}'$ is the molecular weight of the $R_1'$ group; $M_{R2}$ is the molecular weight of the $R_2$ group; $M_{R2}'$ is the molecular weight of the $R_2'$ group; $M_{R3}$ is the molecular weight of the $R_3$ group; $M_{R3}'$ is the molecular weight of the $R_3'$ group; $M_{R4}$ is the molecular weight of the $R_4$ group; and $M_{R4}'$ is the molecular weight of the $R_4'$ group.

The polymeric dispersant herein can be used to disperse any suitable or desired particulate including, but not limited to, pigments. In embodiments, a composition is provided comprising: a particulate; a vehicle; and optional surfactant; and a polymeric dispersant as described herein, wherein the particulate is a pigment. In further embodiments, the particulate is a pigment selected from a member of the group consisting of black pigment, white pigment, cyan pigment, magenta pigment, yellow pigment, and combinations thereof. In a certain embodiment, the particulate is a carbon black pigment.

The composition can include any suitable or desired vehicle. In embodiments, the vehicle is water. In further embodiments, the vehicle comprises water and a co-solvent. In certain embodiments, the vehicle comprises water and a co-solvent; wherein the co-solvent is present in a high amount of above about 30 percent by weight based upon the total weight of the composition such as ink composition.

The composition may further include a surfactant. In embodiments, the surfactant is selected from a member of the group consisting of siloxane polyethers, ethoxylated acetylenic diols, alcohol ethoxylate, and combinations thereof.

In embodiments, an aqueous ink jet ink is described comprising: water; a co-solvent; an optional wax dispersion; an optional latex resin; a surfactant; a pigment; and a polymeric dispersant as described herein, in embodiments wherein the polymeric dispersant comprises a copolymer of the structure:

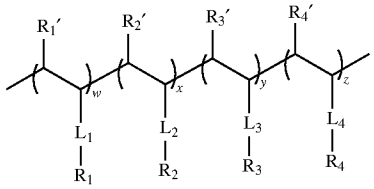

wherein w is an integer of from 1 to about 400; wherein x is an integer of from 0 to about 480; wherein y is an integer of from 1 to about 160; wherein z is an integer of from 1 to about 400; wherein $L_1$ through $L_4$ are optional linking groups; wherein $L_1$ is a linking group selected from a member of the group consisting of ether, urea, epoxy, ester, amide, oxygen, sulfur, and an alkyl chain of from 1 to about 6 carbon atoms; wherein $L_2$ is a linking group selected from a member of the group consisting of ether, urea, epoxy, ester, amide, oxygen, sulfur, and an alkyl chain of from 1 to about 6 carbon atoms; wherein $L_3$ is a linking group selected from a member of the group consisting of ether, urea, epoxy, ester, amide, oxygen, sulfur, and an alkyl chain of from 1 to about 6 carbon atoms; wherein $L_4$ is a linking group selected from a member of the group consisting of ether, urea, epoxy, ester, amide, oxygen, sulfur, and an alkyl chain of from 1 to about 6 carbon atoms; wherein $R_1$ is —$(CH_2)_{3-39}CH_3$; wherein $R_2$ is an aromatic group selected from a member of the group consisting of benzyl, naphthalenyl, anthracenyl, tetracenyl, pentacenyl, tristyrylbenzyl, and pyridiyl; wherein $R_3$ is —$(CH_2CH_2O)_m(CH_2CHCH_3O)_nR$, wherein m is about 10 to about 450, n is about 0 to about 80, and R is H or $CH_3$; wherein $R_4$ is a base group selected from a member of the group consisting of an amine, a pyridine, an imidazole, a benzimidazole, a histidine, a guanidine, a phosphazene base, an ammonium base, a phosphonium base, and an onium base; wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms. In embodiments, the equations $$0.05 < \frac{w(M_{R_1} + M_{R_1'}) + x(M_{R_2} + M_{R_2'})}{w(M_{R_1} + M_{R_1'}) + x(M_{R_2} + M_{R_2'}) + y(M_{R_3} + M_{R_3'}) + z(M_{R_4} + M_{R_4'})} < 0.4$$

$$0.01 < \frac{zM_{R_4}}{w(M_{R_1} + M_{R_1'}) + x(M_{R_2} + M_{R_2'}) + y(M_{R_3} + M_{R_3'}) + z(M_{R_4} + M_{R_4'})}$$

are used to define the dispersant components, wherein w, x, y, and z are integers, and wherein $M_{R1}$ is the molecular weight of the $R_1$ group; $M_{R1}'$ is the molecular weight of the $R_1'$ group; $M_{R2}$ is the molecular weight of the $R_2$ group; $M_{R2}'$ is the molecular weight of the $R_2'$ group; $M_{R3}$ is the molecular weight of the $R_3$ group; $M_{R3}'$ is the molecular weight of the $R_3'$ group; $M_{R4}$ is the molecular weight of the $R_4$ group; and $M_{R4}'$ is the molecular weight of the $R_4'$ group.

The ink compositions herein can consist solely of water, or can comprise a mixture of water and a water soluble or water miscible component, referred to as a co-solvent, humectant, or the like (hereinafter co-solvent) such as alcohols and alcohol derivatives, including aliphatic alcohols, aromatic alcohols, diols, glycol ethers, polyglycol ethers, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof.

When mixtures of water and water soluble or miscible organic solvent liquids are selected as the liquid vehicle, the water to organic co-solvent ratio ranges can be any suitable or desired ratio, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The co-solvent selected is one that will mix with water without phase separation; thus, a co-solvent having a polarity that is compatible with water is selected. The organic component of the ink vehicle can also serve to modify ink surface tension, modify ink viscosity, dissolve or disperse the colorant, and/or affect the drying characteristics of the ink. In embodiments, the ink is more attracted to paper substrates than plastic media as in solvent-based inks.

The water soluble or water miscible organics which are used in the ink formulation can help with surface tension, drying, leveling, etc. In embodiments, water makes up over 50% of the formulation, in embodiments water comprises from about 60 to about 70% of the ink composition. Thus, the ink compositions herein are mainly aqueous.

In certain embodiments, the co-solvent is selected from the group consisting of sulfolane, methyl ethyl ketone, isopropanol, 2-pyrrolidinone, polyethylene glycol, and mixtures thereof.

The total amount of liquid vehicle can be provided in any suitable or desired amount. In embodiments, the liquid vehicle is present in the ink composition in an amount of from about 75 to about 97 percent, or from about 80 to about 95 percent, or from about 85 to about 95 percent, by weight, based on the total weight of the ink composition.

In embodiments, the aqueous inkjet ink comprises a pigment and a polymeric dispersant as described herein, wherein the pigment and the polymeric dispersant are provided together in the form of a pigment dispersion.

In embodiments, the aqueous ink jet ink is free of alkyl phenol ethoxylates.

The aqueous ink jet ink can include any suitable or desired pigment as is known in the aqeuous ink jet ink art including the pigments descried herein. In embodiments, the pigment is carbon black.

The particle size is defined by the diameter of an equivalent sphere having the same volume as the actual pigment particle. Dx represents the x % of particles in the dispersions are smaller than the size based on a volume distribution, e.g. D10 represents the 10% of particles in the dispersions are smaller than this size. My is the volume mean diameter of the pigment particles in the ink.

The particulate, in embodiments, the pigment, may be provided in the form of a particulate or pigment dispersion. In embodiments, the pigment dispersion has an volume-weighted mean diameter of from about 20 to about 500 nanometers (nm), or from about 20 to about 400 nm, or from about 30 to about 300 nm. In embodiments, the dispersion comprises a particulate, in embodiments, a pigment, the polymeric dispersant as described herein, and an optional surfactant. The particle size (volume-weighted mean diameter) is measured at room temperature via a dynamic light scattering particle size analyzer, e.g. a NANOTRAC FLEX or Malvern Mastersizer. The analyzer was operated in backscatter mode at an angle of 173°. Samples were diluted with deionized water and equilibrated at 25° C. for 120 seconds prior to measurement.

Examples of suitable pigments include black pigments, white pigments, cyan pigments, magenta pigments, yellow pigments, and the like. Further, pigments can be organic or inorganic particles. Suitable inorganic pigments include carbon black. However, other inorganic pigments may be suitable such as titanium oxide, cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The particulate, such as pigment, can be present in the ink composition in any desired or effective amount, in embodiments, the pigment can be present in an amount of from about 0.05 to about 15 percent, or from about 0.1 to about 10 percent, or from about 1 to about 5 percent by weight, based on the total weight of the ink composition.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL CO-720™, IGEPAL CO-290™, IGEPAL CA-210™, ANTAROX890™, and ANTAROX897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

In embodiments, the optional surfactant is present and is selected from a member of the group consisting of siloxane polyethers, ethoxylated acetylenic diols, alcohol ethoxylate, and combinations thereof.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

The ink composition can further comprise crosslinkers. In embodiments, the crosslinker is an organoamine, a dihydroxy aromatic compound, isocyanate, a peroxide, a metal oxide, or the like, as well as mixtures thereof. Crosslinking can further enhance the physical properties of the images generated from the ink composition. The crosslinker can be present in any desired or effective amount, in embodiments from about 0.1 to about 20 percent, or from 5 to about 15 percent, by weight, based on the total weight of the ink composition.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, the ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, or from about 2 to about 30 cps at a temperature of about 30° C., although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 70° C., as high as about 50° C., or as high as about 40° C., although the jetting temperature can be outside of these ranges.

In certain embodiments, the ink compositions herein have a viscosity of from about 2 to about 20 centipoise at a temperature of about 30° C.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

Also disclosed herein is a process which comprises applying an ink composition as disclosed herein to a substrate in an imagewise pattern. Also disclosed herein is a process which comprises applying an ink composition as disclosed herein to a substrate as an over coat, wherein the over coat can be clear, colored, or a combination thereof.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, and transferring the ink in the imagewise pattern from the intermediate transfer member to a final recording substrate. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed as the final recording sheet, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like. In embodiments, the substrate comprises a three-dimensional substrate. In embodiments, the substrate comprises medical devices such as catheters, thermometers, cardiac stents, programmable pace makers, other medical devices, menus, food packaging materials, cosmetic tools and products, and any other desired three-dimensional substrate. In further embodiments, the substrate comprises customizable digitally printed ID codes, short-run printable materials three-dimensional medical and any other desired three-dimensional substrate.

In embodiments, the aqueous ink jet ink composition provides an ink wherein the ink exhibits aging stability characterized by a fresh pigment particle size of the ink as measured by a NANOTRAC FLEX and a pigment particle size of the ink after three days of aging at 60° C.

Fresh pigment dispersion or ink means the dispersion or ink freshly prepared at room temperature. Three days of aging at 60° C. means holding the pigment dispersion or ink in a sealed glass vessel for three days at a temperature of 60° C.

Thus, in embodiments, the ink herein exhibits aging stability characterized by comparing the particle size of a freshly prepared ink as measured by a dynamic light scattering particle size analyzer, for example, a NANOTRAC FLEX or Malver Mastersizer, with the particle size of ink after three days of aging at 60° C. The particle size is defined by the diameter of an equivalent sphere having the same volume as the actual pigment particle. Dx represents the x % of particles in the dispersions are smaller than the size based on a volume distribution, e.g. D10 represents the 10% of particles in the dispersions are smaller than this size. My is the volume mean diameter of the pigment particles in the ink.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Synthesis of the polymeric dispersant. 0.8 grams of asobisisobutyronitrile was dissolved in 20 grams of isopropanol in a 500 milliliter flask preheated to 82° C. under nitrogen. 8 grams of 4-vinyl pyridine, 6 grams of behenyl methacrylate, 0.8 gram of azobis-isobutyronitrile and 72 grams of poly(ethylene glycol) methyl ether methacrylate (50 weight percent in water, weight average molecular weight about 3,600) was dissolved in a solution of 100 grams of isopropanol and 20 grams of methyl ethyl ketone. The obtained monomer solution was fed in the the flask at a rate of 2 milliliters/minute. The polymerization was kept at 82° C. for 4 hours after feeding all of the monomers. Subsequently, the solvents were removed under vacuum and water was added to adjust the solid content of the dispersant solution to 25 weight percent.

Example 2

Preparation of pigment dispersion. 20 parts of pigment (Raven 1180P from Birla Carbon), 20 parts of the dispersant solution of Example 1 (20 weight percent), 6 parts of 1,2-hexanediol, and 54 parts of water were homogenized. The resulting dispersion was mixed with 400 parts of zirconia beads (0.3 millimeter) and milled using a paint shaker at 820 revolutions per minute (rpm) for 3 hours to give a pigment dispersion.

Example 3

Preparation of ink. 51 parts (11.33 weight percent pigment) of the pigment dispersion of Example 2, 25 parts of 1,2-propanediol, 5 parts of 1,2-hexanediol, 9 parts (44 weight percent solids) of a latex resin (JONCRYL® 541 available from BASF), 1 part surfactant (BYK-3451), 0.1 part of Proxel® (isothiazolinone, 1,2-benzisothiazolin-3-one, preservative), 1 part wax dispersion (035 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Example 4

Preparation of ink. 51 parts (11.33 weight percent pigment) of the pigment dispersion of Example 2, 25 parts of 1,2-propanediol, 7 parts of 1,2-hexanediol, 4 parts (44 weight percent solid) of a latex resin (JONCRYL® 541 available from BASF), 1 part surfactant (BYK-3451), 0.1 part of Proxel®, 1 part of wax dispersion (0.35 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Example 5

Preparation of ink. 51 parts (11.33 weight percent pigment) of the pigment dispersion of Example 2, 27 parts of 1,2-propanediol, 9 parts of 1,2-hexanediol, 9 parts (44 weight percent solid) of a latex resin (JONCRYL® 541 available from BASF), 1 part surfactant (BYK-3451), 0.1 part of Proxel®, 1 part of wax dispersion (0.35 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Comparative Example 6

Preparation of ink using a commercial block copolymer dispersant. 51 parts (11.33 weight percent pigment) of a pigment dispersion prepared as in of Example 2 except with DISPEX® Ultra PX 4575 (acrylic block copolymer formulation in water available from BASF), 28.5 parts of 1,2-propanediol, 2.5 parts of 1,2-hexanediol, 9 parts (44 weight percent solid) of a latex resin (JONCRYL® 541 available from BASF), 1 part surfactant (BYK-3451), 0.1 part of Proxel®, 1 part of wax dispersion (0.35 weight percent solid) (Joncryl® Wax-35), and 6 parts of water were mixed and filtered through a 1 micron glass membrane filter to remove any coarse particles. The obtained ink was subjected to various ink characterizations and initial Dimatix print test.

Characterization Results.

Ink Stability. The accelerated storage stability was determined by keeping the ink in an oven at 60° C., followed by measuring the particle size after a certain aging time using a Nanotrac particle size analyzer. "Nanotrac" is the model name of the particle size analyzer made by Microtrac. It uses dynamic light scattering technology. Table 1 shows characterization results for black inks prepared with the carbon black dispersion of Examples 3, 4, and 5.

TABLE 1

| Characterization | | Example 3 | Example 4 | Example 5 |
|---|---|---|---|---|
| Viscosity at 37° C. | | 4.37/38.0% | 5.86/50.9% | 5.27/45.8% |
| Surface Tension at 25° C. | | 22.1 | 22.1 | 22.1 |
| Pigment Dispersion Particle Size (nanometers) | Mv | 126.8 | 126.8 | 126.8 |
| | D10 | 72.4 | 72.4 | 72.4 |
| | D50 | 120.6 | 120.6 | 120.6 |
| | D95 | 212.7 | 212.7 | 212.7 |
| | Width | 91.2 | 91.2 | 91.2 |
| Fresh Ink Particle Size (nanometers) | Mv | 125.8 | 127.0 | 125.8 |
| | D10 | 80.7 | 78.7 | 79.3 |
| | D50 | 119 | 121.9 | 122.6 |
| | D95 | 203 | 204 | 194.2 |
| | Width | 75.1 | 79.2 | 72.6 |
| Aging 3-5 Days at 60° C. | Mv | 126.1 | 123.9 | 126.7 |
| | D10 | 76.1 | 80.0 | 77.0 |
| | D50 | 122.5 | 119.1 | 122.5 |
| | D95 | 199.6 | 194.6 | 202.6 |
| | Width | 80.4 | 71.2 | 79.3 |
| 7 Days at 60° C. | Mv | 124.4 | 125.1 | 125.6 |
| | D10 | 77.8 | 76.8 | 79.0 |
| | D50 | 117.7 | 119.7 | 118.4 |
| | D95 | 203.2 | 202.1 | 207.2 |
| | Width | 79 | 80.1 | 77.6 |
| Drawdown Coating Gloss at 20° C. | | 6.5-7.6 | 4.7-5.3 | 5.3-5.9 |

Particle size of the black ink of Comparative Example 6 is shown in Table 2.

TABLE 2

| Ink Characterization | Particle Size (nanometers) | | | | |
|---|---|---|---|---|---|
| | Mv | D10 | D50 | D95 | Width |
| Fresh | 140.4 | 81.2 | 130.2 | 247.1 | 99.8 |
| 3-day at 60° C. | 164.1 | 88.2 | 151.9 | 297.9 | 127.3 |
| 7-day at 60° C. | Gelled | | | | |
| Drawdown Coating Gloss at 20° C. | | | About 3.4 | | |

Thus a dispersant is described having or providing advantageous characteristics including: a non-APE dispersant highly effective for dispersing various pigments; ink prepared using the dispersant exhibits superior stability and printing performance; the dispersant is cost-effective and its synthesis is manufacturable.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A polymeric dispersant comprising:
    a copolymer comprising:
    a basic moiety;
    an alkyl group having from about 4 to about 40 carbon atoms;
    an aromatic group; and
    a steric hydrophilic group.

2. The polymeric dispersant of claim 1, wherein the basic moiety is selected from a member of the group consisting of an aromatic amine, an aliphatic amine, pyridine, imidazole, benzimidazole, histidine, guanidine, phosphazene base, an ammonium base, a phosphonium base, an onium base, and combinations thereof.

3. The polymeric dispersant of claim 1, wherein the copolymer comprises a backbone and wherein the basic moiety is incorporated in the backbone or wherein the basic moiety is a pendant group linked to the backbone.

4. The polymeric dispersant of claim 1, wherein the steric hydrophilic group comprises a member selected from the group consisting of polyethylene glycol, polypropylene glycol, and combinations thereof.

5. The polymeric dispersant of claim 1, wherein the steric hydrophilic group comprises polyethylene glycol having a weight average molecular weight of from about 500 to about 20,000.

6. The polymeric dispersant of claim 1, wherein the copolymer is of the structure:

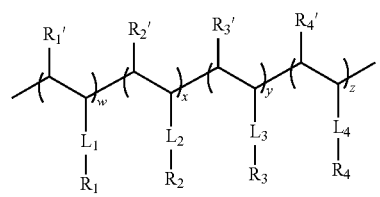

wherein w is an integer of from 1 to about 400;
wherein x is an integer of from 0 to about 480;
wherein y is an integer of from 1 to about 160;
wherein z is an integer of from 1 to about 400;
wherein $L_1$ through $L_4$ are optional linking groups;
wherein $L_1$ is a linking group selected from a member of the group consisting of ether, urea, epoxy, ester, amide, oxygen, sulfur, and an alkyl chain of from 1 to about 6 carbon atoms;
wherein $L_2$ is a linking group selected from a member of the group consisting of ether, urea, epoxy, ester, amide, oxygen, sulfur, and an alkyl chain of from 1 to about 6 carbon atoms;
wherein $L_3$ is a linking group selected from a member of the group consisting of ether, urea, epoxy, ester, amide, oxygen, sulfur, and an alkyl chain of from 1 to about 6 carbon atoms;
wherein $L_4$ is a linking group selected from a member of the group consisting of ether, urea, epoxy, ester, amide, oxygen, sulfur, and an alkyl chain of from 1 to about 6 carbon atoms;
wherein $R_1$ is —$(CH_2)_{3-39}CH_3$;
wherein $R_2$ is an aromatic group selected from a member of the group consisting of benzyl, naphthalenyl, anthracenyl, tetracenyl, pentacenyl, tristyrylbenzyl, and pyridiyl;
wherein $R_3$ is —$(CH_2CH_2O)_m(CH_2CHCH_3O)_nR$, wherein m is about 10 to about 450, n is about 0 to about 80, and R is H or $CH_3$;
wherein $R_4$ is a base group selected from a member of the group consisting of an amine, a pyridine, an imidazole, a benzimidazole, a histidine, a guanidine, a phosphazene base, an ammonium base, a phosphonium base, and an onium base;
wherein $R_1'$, $R_2'$, $R_3'$, and $R_4'$ are each independently selected from a member of the group consisting of H, an alkyl group having from 1 to about 5 carbons atoms, and an aromatic group having from 6 to about 30 carbon atoms.

7. The polymeric dispersant of claim 1, wherein the polymeric dispersant is free of alkyl phenol ethoxylate.

8. The polymeric dispersant of claim 6, wherein the equations $$0.05 < \frac{w(M_{R_1} + M_{R_1'}) + x(M_{R_2} + M_{R_2'})}{w(M_{R_1} + M_{R_1'}) + x(M_{R_2} + M_{R_2'}) + y(M_{R_3} + M_{R_3'}) + z(M_{R_4} + M_{R_4'})} < 0.4$$

and $$0.01 < \frac{zM_{R_4}}{w(M_{R_1} + M_{R_1'}) + x(M_{R_2} + M_{R_2'}) + y(M_{R_3} + M_{R_3'}) + z(M_{R_4} + M_{R_4'})}$$

are used to define the dispersant components,
wherein w, x, y, and z are integers, wherein w is an integer of from 1 to about 400; wherein x is an integer of from 0 to about 480; wherein y is an integer of from 1 to about 160; and wherein z is an integer of from 1 to about 400; and
wherein $M_{R1}$ is the molecular weight of the $R_1$ group; $M_{R1}'$ is the molecular weight of the $R_1'$ group; $M_{R2}$ is the molecular weight of the $R_2$ group; $M_{R2}'$ is the molecular weight of the $R_2'$ group; $M_{R3}$ is the molecular weight of the $R_3$ group; $M_{R3}'$ is the molecular weight of the $R_3'$ group; $M_{R4}$ is the molecular weight of the $R_4$ group; and $M_{R4}'$ is the molecular weight of the $R_4'$ group.

* * * * *